US012332731B2

(12) United States Patent
Texier et al.

(10) Patent No.: US 12,332,731 B2
(45) Date of Patent: Jun. 17, 2025

(54) DEVICE, SYSTEM AND METHOD FOR RESOLVING ERRORS BETWEEN A CLIENT DEVICE, AN INTERMEDIATION SERVER AND A PROVIDER SYSTEM

(71) Applicant: AMADEUS S.A.S., Biot (FR)

(72) Inventors: Rodolphe Gregory Alexandre Texier, Vallauris (FR); Alexandra Sorrentinio, Mougins (FR); Alexandra Imbert, Chateauneuf-Grasse (FR); Pierre Brun, Valbonne (FR); Jeremy Teyssedre, Vallauris (FR); Reda Jebari, Antibes (FR)

(73) Assignee: AMADEUS S.A.S., Biot (FR)

( * ) Notice: Subject to any disclaimer, the term of this patent is extended or adjusted under 35 U.S.C. 154(b) by 156 days.

(21) Appl. No.: 17/903,535

(22) Filed: Sep. 6, 2022

(65) Prior Publication Data

US 2024/0078150 A1   Mar. 7, 2024

(51) Int. Cl.
*G06F 11/00* (2006.01)
*G06F 11/07* (2006.01)

(52) U.S. Cl.
CPC ...... *G06F 11/0772* (2013.01); *G06F 11/0757* (2013.01); *G06F 11/079* (2013.01)

(58) Field of Classification Search
CPC . G06F 11/0772; G06F 11/0757; G06F 11/079
See application file for complete search history.

(56) References Cited

U.S. PATENT DOCUMENTS

| | | | |
|---|---|---|---|
| 9,514,498 B2* | 12/2016 | Masini | G06Q 50/14 |
| 2014/0156357 A1* | 6/2014 | Green | G06Q 30/02 |
| | | | 705/7.41 |
| 2017/0278019 A1* | 9/2017 | Aragone | G06Q 20/407 |
| 2019/0057384 A1* | 2/2019 | Hubli | G06Q 20/407 |
| 2019/0303258 A1* | 10/2019 | Kumar | G06F 11/3495 |
| 2019/0377623 A1* | 12/2019 | Ramachandran | G06F 11/0775 |
| 2021/0191918 A1* | 6/2021 | Amadieu | G06F 16/235 |
| 2022/0276919 A1* | 9/2022 | Kavali | G06F 11/079 |

* cited by examiner

*Primary Examiner* — Elmira Mehrmanesh
(74) *Attorney, Agent, or Firm* — PERRY + CURRIER INC.

(57) ABSTRACT

A device, system and method for resolving errors between a client device, an intermediation server and a provider system. An error-resolving computing device, receives an error indication indicative of a type of an error between an intermediation server and a provider system, the error occurring in conjunction with the intermediation server acting as an intermediary between a client device and the provider system. The error-resolving computing device retrieves, from a memory, code associated with the type of the error, the code comprising one or more of programming code and machine learning code, which, when executed, instructs the error-resolving computing device to respond to the type of the error. The error-resolving computing device executes the code to respond to the type of the error. The error-resolving computing device provides, to the intermediation server, one or more status indications indicative of a state of responding to the error.

16 Claims, 7 Drawing Sheets

DEVICE, SYSTEM AND METHOD FOR RESOLVING ERRORS BETWEEN A CLIENT DEVICE, AN INTERMEDIATION SERVER AND A PROVIDER SYSTEM

FIELD

The specification relates generally to intermediation between devices, and specifically to a device, system and method for resolving errors between a client device, an intermediation server and a provider system.

BACKGROUND

The provision of various products, including for example travel-related goods and services (e.g. flights, hotel reservations, and the like), typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) standard in the context of travel-related products), they may nonetheless employ different mechanisms to initiate the exchange of data. However, certain mechanisms may result in errors between components of a system that exchanged data with regards to provisioning of various products.

SUMMARY

A first aspect of the present specification provides a method comprising: receiving, at an error-resolving computing device, an error indication indicative of a type of an error between an intermediation server and a provider system, the error occurring in conjunction with the intermediation server acting as an intermediary between a client device and the provider system; retrieving, at the error-resolving computing device, from a memory, code associated with the type of the error, the code comprising one or more of programming code and machine learning code, which, when executed, instructs the error-resolving computing device to respond to the type of the error; executing, at the error-resolving computing device, the code to respond to the type of the error; and providing, from the error-resolving computing device, to the intermediation server, one or more status indications indicative of a state of responding to the error.

At the method of the first aspect, the error indication may comprise one or more of an error code and a timeout indication.

At the method of the first aspect, the error indication may comprise one or more of: an identifier of a step of an offer or an order for a provider object provided by the provider system, the step associated with the client device, that one or more of failed or timed out in conjunction with the intermediation server acting as the intermediary between the client device and the provider system; and data received, at the intermediation server, from the provider system, in conjunction with the order.

The method of the first aspect may further comprise: executing, at the error-resolving computing device, the code to respond to the type of the error by communicating with the provider system to resolve the error.

The method of the first aspect may further comprise: executing, at the error-resolving computing device, the code to respond to the type of the error by communicating with the provider system to determine a status of an offer or an order for a provider object provided by the provider system, the status maintained by the provider system, the offer or the order associated with the client device, the error associated with the order; and updating a local copy of the offer or the order based on the status of the offer or the order maintained by the provider system.

At the method of the first aspect, the one or more status indications may include an incident identifier associated with the error indication, and the method may further comprise: receiving, at the error-resolving computing device, from a client-interface computing device in communication with the client device, a request for status of an offer or an order for a provider object provided by the provider system, the offer or the order maintained by the provider system, the offer or the order associated with the client device, the error associated with the offer or the order, and the error identified by the incident identifier; and returning, from the error-resolving computing device, to the client-interface computing device, one or more of the status of the offer or the order, and progress of the error-resolving computing device in responding to the error.

At the method of the first aspect, the one or more status indications may include an incident identifier associated with the error indication, and the method may further comprise: receiving, at the error-resolving computing device, from a client-interface computing device in communication with the client device, a request to cancel or roll back a step of an offer or an order for a provider object provided by the provider system, the offer or the order maintained by the provider system, the offer or the order associated with the client device, the error associated with the offer or the order, and the error identified by the incident identifier; and communicating, at the error-resolving computing device, with the provider system to cancel the order or roll back to an earlier step of the offer or the order, according to the request.

At the method of the first aspect, the one or more status indications indicative of the state of responding to the error may comprise an indication of an estimated time for resolving the error.

A second aspect of the present specification provides a device comprising: a communication interface; and a controller configured to: receive, via the communication interface, an error indication indicative of a type of an error between an intermediation server and a provider system, the error occurring in conjunction with the intermediation server acting as an intermediary between a client device and the provider system; retrieve, from a memory, code associated with the type of the error, the code comprising one or more of programming code and machine learning code, which, when executed, instructs the error-resolving computing device to respond to the type of the error; execute the code to respond to the type of the error; and provide, via the communication interface, to the intermediation server, one or more status indications indicative of a state of responding to the error.

At the device of the second aspect, the error indication may comprise one or more of an error code and a timeout indication.

At the device of the second aspect, the error indication may comprise one or more of: an identifier of a step of an offer or an order for a provider object provided by the provider system, the step associated with the client device, that one or more of failed or timed out in conjunction with the intermediation server acting as the intermediary between the client device and the provider system; and data received, at the intermediation server, from the provider system, in conjunction with the order.

At the device of the second aspect, the controller may be further configured to: execute the code to respond to the type of the error by communicating with the provider system to resolve the error.

At the device of the second aspect, the controller may be further configured to: execute the code to respond to the type of the error by communicating with the provider system to determine a status of an offer or an order for a provider object provided by the provider system, the status maintained by the provider system, the offer or the order associated with the client device, the error associated with the order; and update a local copy of the offer or the order based on the status of the offer or the order maintained by the provider system.

At the device of the second aspect, the one or more status indications may include an incident identifier associated with the error indication, and the controller may be further configured to: receive, from a client-interface computing device in communication with the client device, a request for status of an offer or an order for a provider object provided by the provider system, the offer or the order maintained by the provider system, the offer or the order associated with the client device, the error associated with the offer or the order, and the error identified by the incident identifier; and return, to the client-interface computing device, one or more of the status of the offer or the order, and progress of the error-resolving computing device in responding to the error.

At the device of the second aspect, the one or more status indications may include an incident identifier associated with the error indication, and the controller may be further configured to: receive, from a client-interface computing device in communication with the client device, a request to cancel or roll back a step of an offer or an order for a provider object provided by the provider system, the offer or the order maintained by the provider system, the offer or the order associated with the client device, the error associated with the offer or the order, and the error identified by the incident identifier; and communicate with the provider system to cancel the order or roll back to an earlier step of the offer or the order, according to the request.

At the device of the second aspect, the one or more status indications indicative of the state of responding to the error may comprise an indication of an estimated time for resolving the error.

A third aspect of the present specification provides a non-transitory computer-readable medium storing a computer program, wherein execution of the computer program is to implement a method comprising: receiving, at an error-resolving computing device, an error indication indicative of a type of an error between an intermediation server and a provider system, the error occurring in conjunction with the intermediation server acting as an intermediary between a client device and the provider system; retrieving, at the error-resolving computing device, from a memory, code associated with the type of the error, the code comprising one or more of programming code and machine learning code, which, when executed, instructs the error-resolving computing device to respond to the type of the error; executing, at the error-resolving computing device, the code to respond to the type of the error; and providing, from the error-resolving computing device, to the intermediation server, one or more status indications indicative of a state of responding to the error.

At the method of the third aspect, the error indication may comprise one or more of an error code and a timeout indication.

At the method of the third aspect, the error indication may comprise one or more of: an identifier of a step of an offer or an order for a provider object provided by the provider system, the step associated with the client device, that one or more of failed or timed out in conjunction with the intermediation server acting as the intermediary between the client device and the provider system; and data received, at the intermediation server, from the provider system, in conjunction with the order.

The method of the third aspect may further comprise: executing, at the error-resolving computing device, the code to respond to the type of the error by communicating with the provider system to resolve the error.

The method of the third aspect may further comprise: executing, at the error-resolving computing device, the code to respond to the type of the error by communicating with the provider system to determine a status of an offer or an order for a provider object provided by the provider system, the status maintained by the provider system, the offer or the order associated with the client device, the error associated with the order; and updating a local copy of the offer or the order based on the status of the offer or the order maintained by the provider system.

At the method of the third aspect, the one or more status indications may include an incident identifier associated with the error indication, and the method may further comprise: receiving, at the error-resolving computing device, from a client-interface computing device in communication with the client device, a request for status of an offer or an order for a provider object provided by the provider system, the offer or the order maintained by the provider system, the offer or the order associated with the client device, the error associated with the offer or the order, and the error identified by the incident identifier; and returning, from the error-resolving computing device, to the client-interface computing device, one or more of the status of the offer or the order, and progress of the error-resolving computing device in responding to the error.

At the method of the third aspect, the one or more status indications may include an incident identifier associated with the error indication, and the method may further comprise: receiving, at the error-resolving computing device, from a client-interface computing device in communication with the client device, a request to cancel or roll back a step of an offer or an order for a provider object provided by the provider system, the offer or the order maintained by the provider system, the offer or the order associated with the client device, the error associated with the offer or the order, and the error identified by the incident identifier; and communicating, at the error-resolving computing device, with the provider system to cancel the order or roll back to an earlier step of the offer or the order, according to the request.

At the method of the third aspect, the one or more status indications indicative of the state of responding to the error may comprise an indication of an estimated time for resolving the error.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
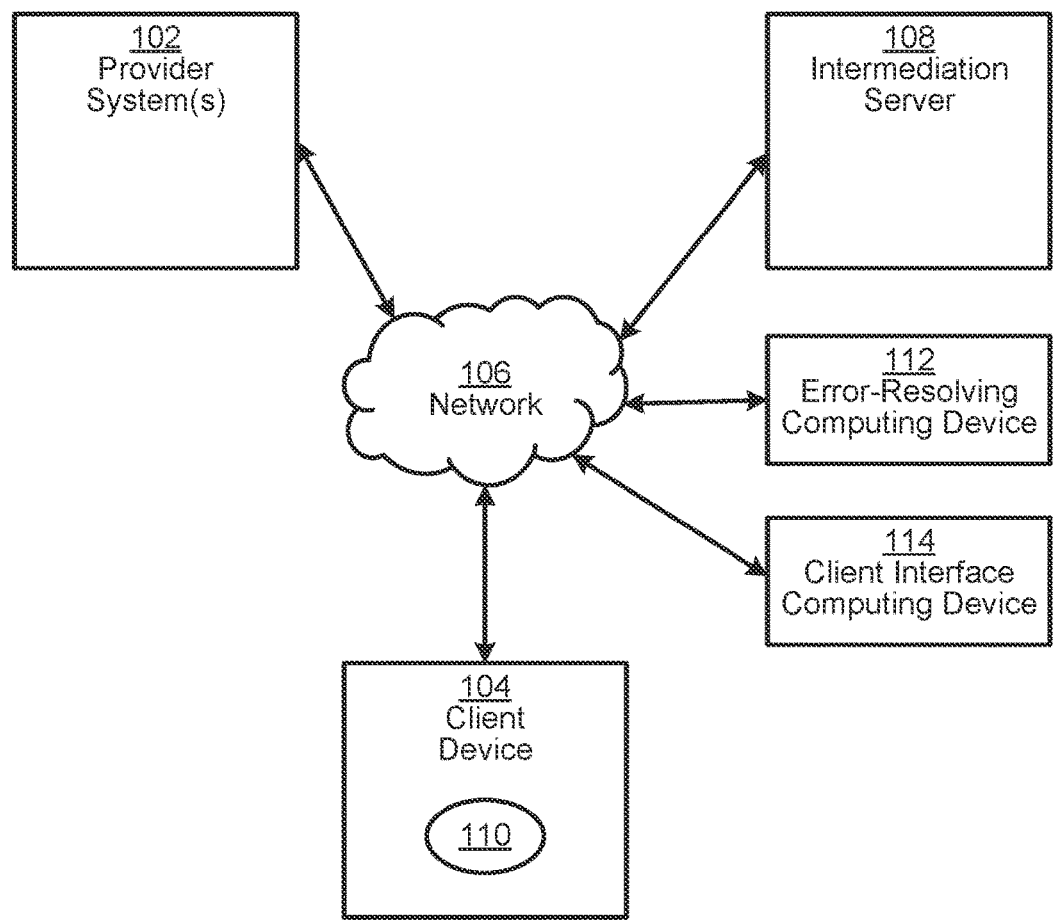
FIG. 1 depicts a system for resolving errors between a client device, an intermediation server and a provider system, according to non-limiting examples.

FIG. 1 depicts a system 100 for intermediation between a provider system (e.g. one or more servers or other suitable computing devices), and a client device. Provider objects, in the examples discussed herein, may comprise provider objects and/or data records which correspond to products and/or items, such as travel-related goods and services (e.g. flights, hotel reservations, car rentals and the like), provided by a provider system. More specifically, the products and/or items discussed in the examples below may be flight tickets and related services (e.g. limo pickup services, excursions at a destination, baggage check services, in-flight food, entertainment, pet-related services, and the like). However, as will be apparent to those skilled in the art, the systems and methods discussed below can also be applied to various other types of data objects and/or items including, but not limited to, data objects correspond to any suitable products and/or any suitable items available (e.g. for purchase, and the like) from any suitable website, and the like.

Delivery of the items mentioned above is typically controlled by a provider entity, such as an airline in the case of the items discussed in connection with the travel-industry related examples provided herein. The system 100 includes one or more provider systems 102 (e.g. one or more servers or other suitable computing devices), which in this example is operated by one or more provider entities. The system 100 can include a plurality of client devices 104, although only one client device 104 is shown in FIG. 1 for illustrative purposes.

The system 100 can include a plurality of provider systems 102, each operated by respective provider entities (e.g. various airlines), although only one provider system 102 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 102.

A provider object is understood to define an item, or a combination of items, which may be offered for purchase (e.g. by end users of the items) including, but not limited to one or more of flights, train rides, hotel stays, airport lounge access, seat upgrades, baggage check services, in-flight food, entertainment, pickup services, excursion services, pet-related services, and the like, and/or associated services. Thus, in examples discussed below, a provider object may define a flight operated by the provider entity, and/or services associated with the flight, or proposed as standalone services. Each provider object therefore may contain various fields (e.g. data fields), and the like. Certain fields define item attributes, such as product object identifiers (e.g. service identifiers, item identifiers, product identifiers and the like), locations, dates and times corresponding to the products (e.g. flight times and other itinerary data). The type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Requests for provider objects may be received at the provider system 102 from other components of the system 100. For example, the requests may be received from a client device 104, via a network 106 (e.g. any suitable combination of local and wide area networks, including the Internet) and via an intermediation server 108. As will be described below, the intermediation server 108 generally intermediates between the client device 104 and the provider system 102, for example such that the client device 104 may request products from the provider system 102 (and/or more than one provider system 102) via the intermediation server 108.

Furthermore, in some examples, the intermediation server 108 may convert data between formats associated with provider systems 102 and the client device 104. For example, a first provider system 102 may communicate and/or provide provider objects, and/or offers for provider objects, according to a first format, and a second provider system 102 may communicate and/or provide provider objects, and/or offers for provider objects, according to a second format (e.g. which may be the same or different from the first format). Neither format may be compatible with a format used by the client device 104 to communicate. As such, the intermediation server 108 may convert data received in different formats from the provider system 102, to a format compatible with the client device 104, and vice versa.

The client device 104, in the present example, may be operated by a travel agent entity, and therefore generates and provides requests for provider objects (e.g. representing products which may be for purchase), and/or requests to purchase products (e.g. represented by the provider objects), to the provider system 102, via the intermediation server 108, on behalf of end users (e.g. travelers). However it is understood that the client device 104 may request that any suitable actions, and the like, associated the provider objects, occur, for example via the intermediation server 108, for example as described below with respect to FIG. 3.

Hence, in one example, the intermediation server 108 may comprise an aggregator server which communicates with a plurality of provider systems 102 and aggregates provider objects and/or offers for provider objects from the plurality of provider systems 102, to provide to the client device 104. When formats of data used by the provider systems 102 and the client device 104 are compatible, the intermediation server 108 may not perform the conversions described herein when performing the aggregation functionality.

Alternatively, a client device 104 may be operated by a provider system 102. In yet another alternative, a provider system 102 may operate the intermediation server 108. Hence, it is understood that while the provider system 102, the client device 104 and the intermediation server 108 are all depicted as being separate from each other in FIG. 1, they may be associated with various combinations of one or more entities, and/or functionality of the provider system 102, the client device 104 and the intermediation server 108 may be combined in any suitable manner at one or more computing devices and/or servers and/or cloud computing devices. As such, herein, rather than refer to components of the system 100 communicating via transmitting data therebetween (e.g. such as via the network 106), herein communication between components of the system 100 is referred to as the components providing data, and the like, therebetween which may include, but is not limited to, transmitting data over the network 106, communicating data when the components are local to each other and/or combined, and the like.

Various other mechanisms for initiating the creation of the provider objects are also contemplated. For example, end users (via the client device 104 and/or client devices and/or additional computing devices, not shown in FIG. 1) may initiate the creation of the provider objects via direct interaction with a website hosted by the intermediation server 108. Various mechanisms for the creation of provider objects will be apparent to those skilled in the art, such as the "offer" and "order" mechanisms specified by the NDC standard. However, the terms "offer" and "order" as used herein may be more generic; for example, an offer for a provider object may refer to any suitable indication of provider object that may be available, for example for purchase, while an order for a provider object may refer to any suitable request to book and/or purchase a provider object that was previously indicated as being available. Such offers and orders, and steps associated with same, are described below with respect to FIG. 3.

The client device 104 is configured to receive data contained in the provider objects via the intermediation server 108. Data obtained by the client device 104, via the intermediation server 108, may be presented to users served by the client device 104, for example via a display screen (not depicted) which may be local to the client device 104; further information associated with the items represented by the provider objects may be requested by the client device 104 which may include, but is not limited to the client device 104 ordering the items. In other words, the system 100 enables the client device 104 to request further information associated with the items represented by the provider objects, via the intermediation server 108. The client device 104 may be configured to request the further information and/or initiate such orders by providing requests to the provider system 102 via the intermediation server 108.

The provider objects provided by the provider system 102 generally include provider object data representing at least one item provided by the provider system 102. In some examples, the provider object data may include a provider object identifier and/or provider object identifier data, that identifies the provider object to the provider system 102. The provider object data generally comprises information that identifies a travel related product and/or service. Whether the provider object data includes a specific provider object identifier, or not may depend on whether a provider object is being in an NDC or GDS format. For example, when a provider object comprises an NDC offer, the provider object identifier data may comprise an identifier generated by the provider system 102 which specifically identifies the NDC offer. However, when a provider object comprises an Edifact recommendation, which generally does not include a specific identifier, the Edifact recommendation may be identified by the provider system 102 based on provider object identifier data such as characteristics of the Edifact recommendation such as a specific order and/or format of data of the Edifact recommendation.

In general, communication between the client device 104 and the intermediation server 108 occurs via a computing-process flow 110 implemented by the client device 104, such as an Applications Programming Interface (API), and the like. For example, during offering and ordering of a provider object (e.g. booking a flight), the client device 104 may implement the computing-process flow 110 in the form of an API, and communications between the client device 104 and the intermediation server 108 may be defined by the API.

Figure 3:
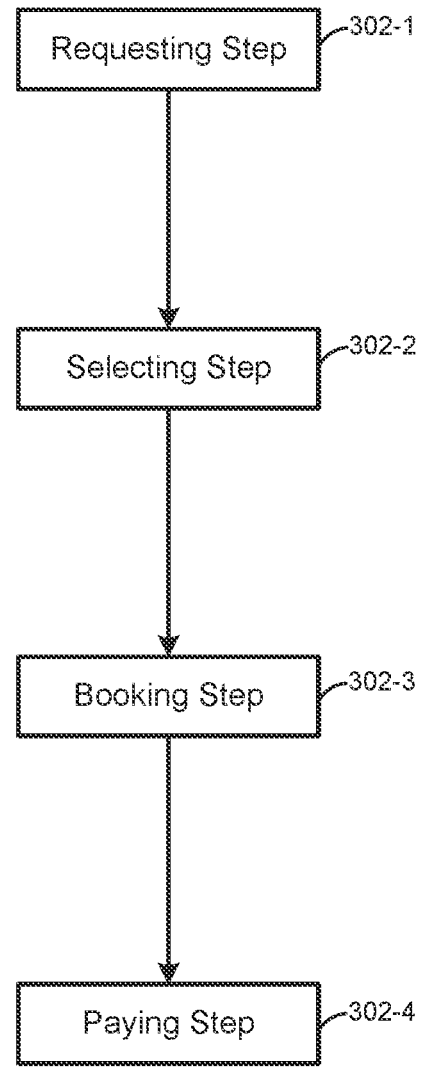
FIG. 3 depicts a computing-process flow of the system of FIG. 1, according to non-limiting examples.

Regardless, the steps of offering and ordering a provider object may occur according to a predefined series of steps, which are discussed in more detail with respect to FIG. 3 but which may include a requesting step, a selecting step, a booking step and a paying step. It is understood, however, that such steps are not meant to be exhaustive, and other steps may occur in in the computing-process flow 110. However, in any of these steps, errors may occur in the system 100. For example, in the booking and/or paying steps, a timeout may occur at a provider system 102 during an attempt to book and/or pay for a selected provider object (e.g. provided in the requesting step and/or selected at the selecting step). Hence, while the client device 104 may be expecting a confirmation of a payment and/or a booking from the intermediation server 108, and the intermediation server 108 may be waiting for the provider system 102 to acknowledge a payment and/or a booking, the provider system 102 may not respond to a request to pay and/or book within a given time period (e.g. a timeout), such that an error occurs in the system 100. A similar timeout error may occur at the requesting step when the client device 104 is requesting offers of provider objects from the provider system 102 via the intermediation server 108.

However, it is understood that a timeout error is merely but one example of errors that may occur in the system 100, and any suitable errors are within the scope of the present specification. For example, a provider system 102 may experience an error in processing any suitable request and/or data received from the intermediation server 108 and generate an error indication of a type of an error that occurred and return the error indication to the intermediation server 108. In a particular example, an attempt to process payment information, such as credit card information, may fail and/or be delayed for various reasons, such as a timeout with a payment server, and the like, and an error indication of same may be provided to the intermediation server 108. Furthermore, an error indication may comprise one or more of an alphanumeric indicator, an alphanumeric error code, an error description (e.g. text), a program dump (e.g. content of a process executing code that returned the error), and the like.

Regardless of the nature of any errors that occur, such errors may cause the client device 104 and/or the intermediation server 108 to expend processing resources and bandwidth waiting for responses (e.g. with regards to the intermediation server 108 waiting for responses from the provider system 102 and/or the client device 104 waiting for responses from the intermediation server 108) and/or waiting until the provider system 102 completes a requested action. Further, when the provider system 102 returns an error indication to the intermediation server 108, the intermediation server 108 has no way of determining if the provider system 102 will take a further action to resolve the error that lead to the error indication, and hence the intermediation server 108 may not accurately provide the client device 104 with information as whether the error is being resolved or not.

To address this issue, the system 100 further comprises an error-resolving computing device 112, described in more detail below, which is generally configured to resolve errors between other components of the system 100. For example, as will be explained in more detail below, the error-resolving computing device 112 may receive from the intermediation server 108, an error indication that indicates a type of error that has occurred (e.g. between the intermediation server 108 and a provider system 102), and retrieve from a memory associated code that, when executed, instructs the error-resolving computing device 112 to respond to the type of the error. The error-resolving computing device 112 may further provide, to the intermediation server 108, status indications indicative of a state of responding to the error, for example in conjunction with executing the code.

Such responding to a type of an error, for example to resolve the error, may include, but is not limited to:

The error-resolving computing device 112 communicating with the provider system 102 to determine a current status of an offer or an order for a provider object. For example, the error-resolving computing device 112 may communicate with the provider system 102 to determine whether the current status of an offer or an order is "paid or "not paid".

The error-resolving computing device 112 updating a local copy of the offer or the order based on the status of the offer or the order maintained by the provider system 102. For example, when the current status of the offer or the order maintained by the provider system 102 is "paid" but the status of the offer or the order maintained by the intermediation server 108 is "not paid" (e.g. a copy of the status of the offer or the order maintained by the intermediation server 108 is understood to be a "local copy"), the error-resolving computing device 112 may update the local copy of the offer or the order to be "paid", or the same as the status maintained by the provider system 102, which is considered to be more accurate and/or most current as compared to the local copy of the status of the offer or the order maintained by the intermediation server 108.

The error-resolving computing device 112 communicating with the provider system 102 to cancel the offer or the order. For example, when certain error indications are received, such as an error indication indicating that there was a timeout with a payment server, the error-resolving computing device 112 may communicate with the provider system 102 to cancel the offer or the order.

The error-resolving computing device 112 communicating with the provider system 102 to roll back to an earlier step associated with the offer or the order, according to the request. For example, when certain error indications are received, such as an error indication indicating that there was a timeout with a payment server, the error-resolving computing device 112 may communicate with the provider system 102 to cancel the offer or the order and furthermore, communicate with the provider system 102 and the intermediation server 108 to roll back from the payment step 302-4 in the computing-process flow 110 to the booking step 302-3 in the payment processing flow.

The error-resolving computing device 112 estimating a time for resolving the error and communicating such an estimation of time to the intermediation server 108. Furthermore, an estimated time for resolving an error may cause the error-resolving computing device 112 and/or the intermediation server 108 to behave differently, depending on whether the estimated time is above or below a threshold time, such as 1 minute (though any suitable time is within the scope of the present specification, such as seconds, 2 minutes, 3 minutes, etc.). For example, when the estimated time to resolve the error, such as to resolve processing of payment information that was delayed, is less than the threshold time, the error-resolving computing device 112 may communicate with the provider system 102 to instruct the provider system 102 to complete the processing. Alternatively, and/or in addition, when the estimated time to resolve the error is less than the threshold time, a reply to the client device 104 by the intermediation server 108, in conjunction with execution of a step 302 of the computing-process flow 110, may occur after such processing is completed. In contrast, when the estimated time to resolve the error, such as to resolve processing of payment information that was delayed, is greater than the threshold time, the error-resolving computing device 112 may communicate with the provider system 102 to instruct the provider system 102 to cancel the processing (e.g. to cancel an offer or an order and/or to roll back to a previous step 302 in the computing-process flow 110). Alternatively, and/or in addition, when the estimated time to resolve the error is greater than the threshold time, data indicative of the error may be provided to the client device 104, for example with an error code and an incident number, and which may prompt an operator of the client device 104 to check offline for a resolution to the error (e.g. via a client-interface computing device 114, described below); such examples assume that the error may be logged in a database and/or memory, and the like, and assigned an incident ticket number for use by an operator of the client device 104 in referencing the error and/or incident that lead to the error; such an incident ticket number may be the same as, or different from, an incident identifier and/or error indication described herein).

The error-resolving computing device 112 implementing another suitable type of response to the error.

As depicted, the system 100 further comprises a client-interface computing device 114 configured to provide a communication interface between the error-resolving computing device 112 and the client device 104. The client-interface computing device 114 may act as a portal for the client device 104 to communicate with the error-resolving computing device 112, for example such that the client device 104 may request a status of an error from the error-resolving computing device 112. Indeed, in some examples, the client device 104 may communicate with the error-resolving computing device 112 via the client-interface computing device 114 to request to cancel or roll back a step of an offer or an order, and the error-resolving computing device 112 may communicate with the provider system 102 to cancel the offer or the order, or roll back to an earlier step of the offer or the order, according to a request received via the client-interface computing device 114. An example of a GUI for the portal is described with reference to FIG. 7.

While the intermediation server 108, the error-resolving computing device 112 and the client-interface computing device 114 are depicted as being separate from one another, it is understood that functionality of two or more of intermediation server 108, the error-resolving computing device 112 and the client-interface computing device 114 may be at least partially combined, for example in one or more servers, cloud computing devices and the like. For example, functionality of the error-resolving computing device 112 and the client-interface computing device 114 may be combined.

While present examples may be implemented in any suitable manner, it is further understood that, in some examples, the intermediation server 108 and/or one or more of the provider systems 102 may operate according to an NDC standard.

Figure 2:
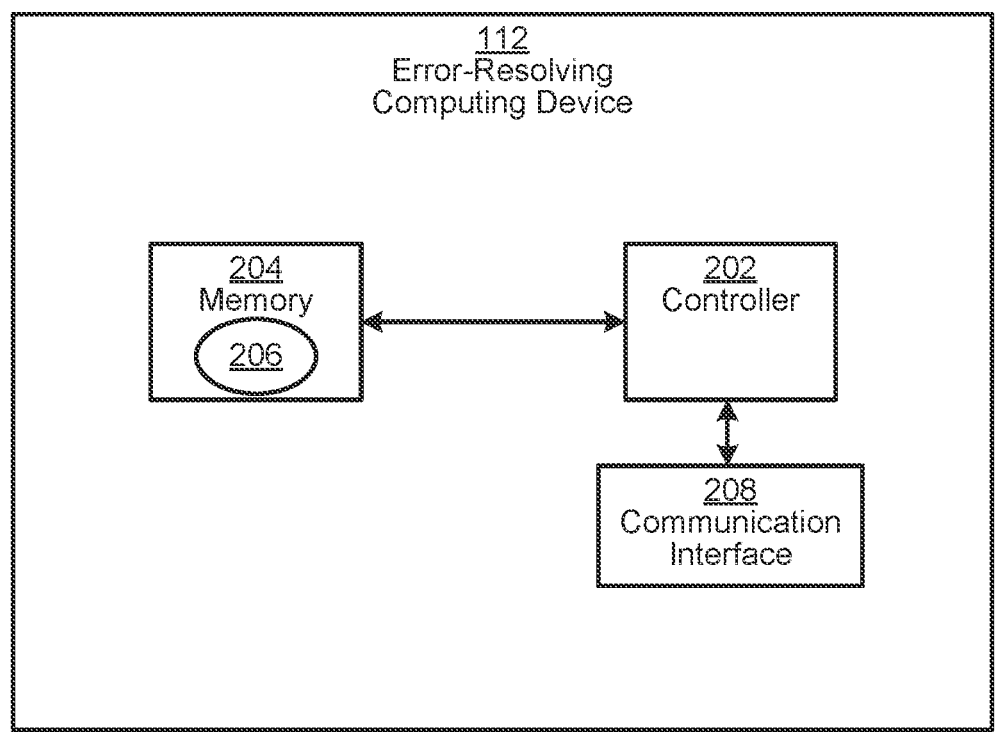
FIG. 2 depicts an error-resolving computing device for resolving errors between a client device, an intermediation server and a provider system, according to non-limiting examples.

Turning to FIG. 2, before discussing the functionality of the system 100 in greater detail, certain components of the error-resolving computing device 112 will be discussed in greater detail. While depicted as one device, the error-resolving computing device 112 may comprise one or more computing devices and/or one or more cloud computing devices that may be geographically distributed.

As shown in FIG. 2, the error-resolving computing device 112 includes at least one controller 202, such as a central processing unit (CPU) or the like. The controller 202 is interconnected with a memory 204 storing an application 206, the memory 204 implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the error-resolving computing device 112 to communicate with the other computing devices of the system 100 (i.e. the provider systems 102, the intermediation server 108, and the client device 104 via the client-interface computing device 114) via the network 106, though it is understood such communication may occur locally when components of the system 100 are combined. The communication interface 208 therefore may include any necessary components (e.g. network interface controllers (NICs), radio units, and the like) to communicate via the network 106. The specific components of the communication interface 208 may be selected based on the nature of the network 106 and/or local communication between components of the system 100, and the like. The error-resolving computing device 112 can also include input and output devices connected to the controller 202, such as keyboards, mice, displays, and the like (not shown).

The components of the error-resolving computing device 112 mentioned above can be deployed in a single enclosure, or in a distributed format. In some examples, therefore, the error-resolving computing device 112 includes a plurality of processors, either sharing the memory 204 and communication interface 208, or each having distinct associated memories and communication interfaces. As such, it is understood that the memory 204, and/or a portion of the memory 204, may be internal (e.g. as depicted) or external to the error-resolving computing device 112; regardless, the controller 202 is understood to have access to the memory 204.

The memory 204 also stores a plurality of computer-readable programming instructions, executable by the controller 202, in the form of various applications, including the application 206. As will be understood by those skilled in the art, the controller 202 executes the instructions of the application 206 (and any other suitable applications) in order to perform various actions defined by the instructions contained therein. In the description below, the controller 202, and more generally the error-resolving computing device 112, are said to be configured to perform those actions. It will be understood that they are so configured via the execution (by the controller 202) of the instructions of the applications stored in memory 204.

In some examples, execution of the application 206, as will be discussed below, configures the error-resolving computing device 112 to implement functionality for resolving errors between components of the system 100, including but not limited to, the blocks of a method set forth in FIG. 5.

As will be described in more detail below, in some examples, the application 206 may comprise one or more machine learning algorithms trained to implement functionality for resolving errors between components of the system 100, including but not limited to, the blocks of a method set forth in FIG. 5. However, alternatively, or in addition, the application 206 may comprise one or more programmatic algorithms.

While structure of the provider system 102, the client device 104, the intermediation server 108 and the client-interface computing device 114 is not described in detail, the provider system 102, the client device 104, the intermediation server 108 and the client-interface computing device 114 are understood to have a similar structure as the error-resolving computing device 112, but adapted for respective functionality as described herein.

Attention is next directed to FIG. 3 which depicts a block diagram of an example of the computing-process flow 110. While the example computing-process flow 110 is depicted in the form of a flow chart, it is understood that the example computing-process flow 110 (e.g. hereafter the computing-process flow 110) may show steps of an application programming interface (API) that include steps 302-1, 302-2, 302-3, 302-4, hereafter interchangeably referred to, collectively, as the steps 302 and, generically, as a step 302. This convention will be used throughout the present specification. It is understood, however, that the depicted steps 302 are not meant to be exhaustive, and other steps may occur in in the computing-process flow 110.

For example, at the requesting step 302-1, a user of the client device 104 may enter criteria and/or details at data fields of a graphic user interface (GUI) used for searching for provider objects representing flights, such as a date (e.g. and time) for a flight, a departure airport, an arrival airport, among other possibilities; the criteria may be provided to the intermediation server 108, and the intermediation server 108 may provide the criteria and/or details to the provider systems 102. The provider systems 102 may return respective offers of provider objects representing flights that meet the criteria and/or details. In general, such offers of provider objects may be customized based on options associated with a provider system 102. The intermediation server 108 may aggregate offers of provider objects from a plurality of provider systems 102 and return the offers of provider objects to the client device 104. In NDC-based data exchanges, it is understood that the offers may be identified by respective offer identifiers (e.g. which may be referred to as OfferIds and/or an OfferID).

At the selecting step 302-2, a list of offers of the provider objects representing the flights returned by the provider systems 102, via the intermediation server 108, may be provided in a GUI at a display screen associated with the client device 104, and from which a user of the client device 104 may select, for example, a flight to book; in some examples, the user of the client device 104 may select electronic buttons, and the like to add a service to an offer and/or a provider object, such as a pickup service. At the selecting step 302-2, the client device 104 may request a "firm" offer for the selected provider object, such as a "firm" and/or finalized price, which may be different from a "published" price. Any suitable exchanges of data via the network 106 between the client device 104, the intermediation server 108, and the provider system 102 are understood to occur to select, request and receive the firm offer of the provider object, however such data exchanges are understood to be based on the aforementioned offer identifiers when such data exchanges comprise NDC-based data exchanges (e.g. using an offer identifier of a selected offer).

Similarly, at the booking step 302-3, information for a selected provider object, such as the aforementioned flight, may be provided in a GUI at a display screen, and from which a user of the client device 104 may select electronic buttons to pay for and/or order the flight, and/or to add a service to a booking, such as a pickup service, and the like. Any suitable exchanges of data via the network 106 between the client device 104, the intermediation server 108, and the provider system 102 are understood to occur to book and/or order the firm offer of the provider object however such data exchanges are understood to be based on the aforementioned offer identifiers when such data exchanges comprise NDC-based data exchanges. In NDC-based data exchanges, it is understood that the orders may be identified by respective order identifiers (e.g. which may be referred to as OrderIds and/or an OrderID).

Similarly, at the paying step 302-4, fields for entering payment information, such as credit card information, to pay for a selected flight being booked may be provided in a GUI at a display screen. Any suitable exchanges of data via the network 106 between the client device 104, the intermediation server 108, and the provider system 102 are understood to occur to pay for the firm offer of the provider object. It is understood that the term "order" as used herein may refer to a booking of an offer, and which may include an offer that is only booked, but not yet paid for, or an order which is booked and payed for, depending on which steps 302 of the computing-process flow 110 have been implemented.

Figure 4:
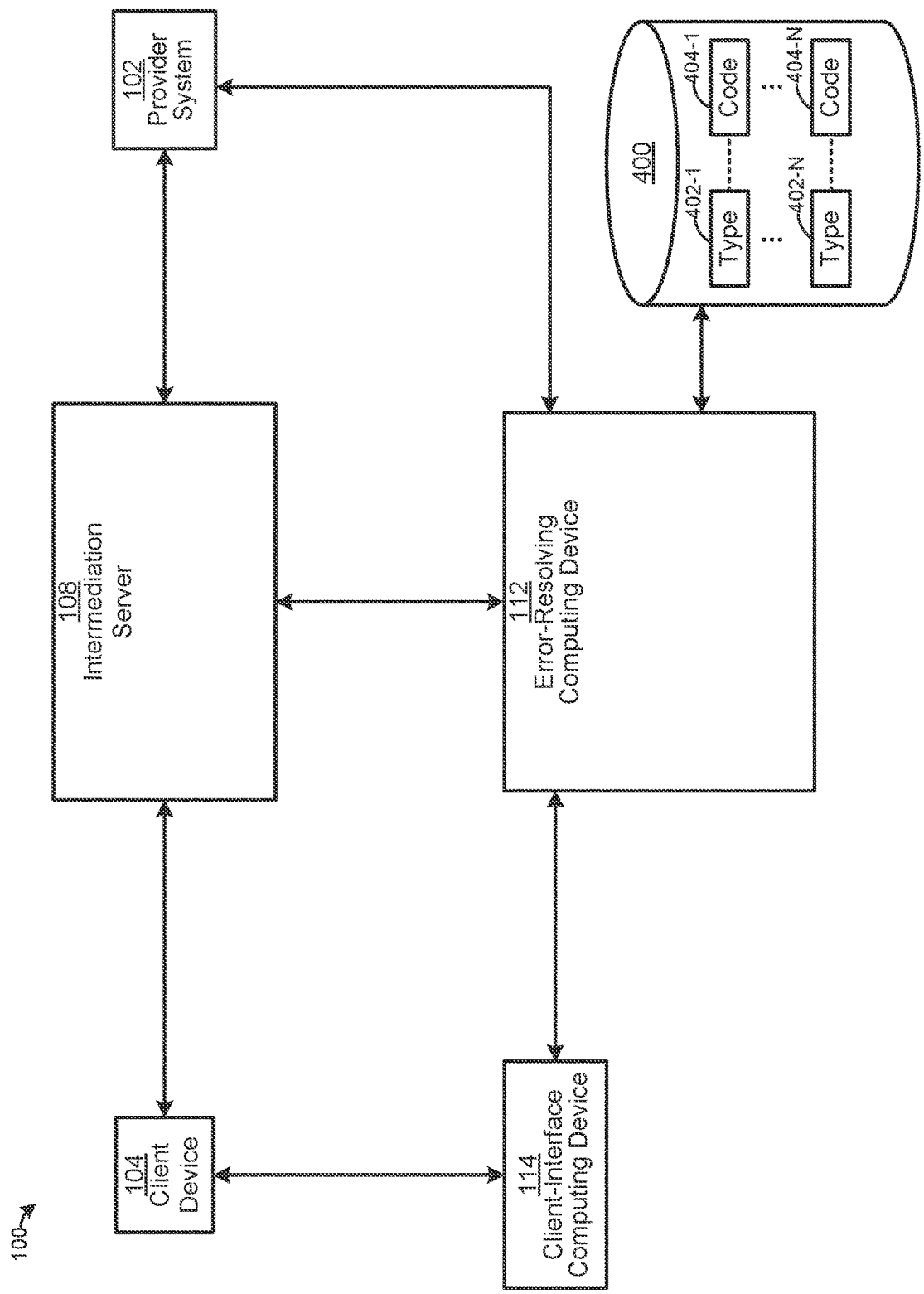
FIG. 4 depicts the system of FIG. 1 in further detail, according to non-limiting examples.

Attention is now directed to FIG. 4 which illustrates one example of the system 100 that includes one provider system 102, one client device 104, and the intermediation server 108 intermediating therebetween, as well as the error-resolving computing device 112 and the client-interface computing device 114. While the network 106 is not depicted, it is nonetheless understood to be present. For example, communication links between components of the system 100 are depicted in FIG. 4, and throughout the present specification, as double-ended arrows between respective components; the communication links may include any suitable combination of wireless and/or wired links and/or wireless and/or wired communication networks including, but not limited to, the network 106.

In particular, as depicted, the error-resolving computing device 112 is in communication with the provider system 102 and the intermediation server 108; furthermore, the error-resolving computing device 112 is in communication with the client device 104 via the client-interface computing device 114.

Also depicted in FIG. 4 is a memory 400 to which the error-resolving computing device 112 has access. While depicted in the form of a database, the memory 400 may comprise one or more suitable memories 400. The memory 400, which may be referred to hereafter interchangeably as one or more memories 400, may be separate from the intermediation server 108 and/or at least partially integrated with the error-resolving computing device 112, for example at the memory 204.

As depicted, the memory 400 stores any suitable number, "N", of indications of types 402-1 . . . 402-N of errors, which may be stored in respective association with code 404-1 . . . 404-N for instructing the error-resolving computing device 112 to respond to a respective type 402-1 . . . 402-N of an error.

For simplicity, herein, the indications of types 402-1 . . . 402-N of errors is interchangeably referred to, collectively, as types 402, and, generically, as a type 402. This convention, or similar, will be used elsewhere in the present application. For example, the code 404-1 . . . 404-N will be interchangeably referred to, collectively, as code 404 and/or codes 404, and, generically, as code 404 and/or a set of code 404.

In some examples, the types 402 may comprise respective error codes, such as alphanumeric sequences of letters and/or numbers, and the like, assigned to a particular type of respective error. However, the types 402 may comprise any suitable indication of an error, such as a timeout indication in any suitable format, and the like.

The code 404 may comprise respective programming code (e.g. a set of instructions, and the like) and/or machine learning code which may be processed by the error-resolving computing device 112 when responding to a respective type 402 of an error.

For example, the error-resolving computing device 112 may receive an error indication indicative of a type 402 of an error between the intermediation server 108 and the provider system 102, search the memory 400 for a matching type 402, and retrieve and process the associated code 404.

In general the types 402 may be prepopulated at the memory 400 along with associated code 404.

A given set of code 404 may comprise programmatic instructions and programming code which may be processed by the error-resolving computing device 112 when responding to a respective type 402 of an error. However, a given set of code 404 may comprise machine learning code, including, but not limited to, one or more neural network layers, and the like, which may be processed by one or more machine learning algorithms and/or neural networks being implemented by the error-resolving computing device 112. As such, it is understood that the error-resolving computing device 112 may be trained to respond to various errors by way of such one or more machine learning algorithms and/or neural networks, and the one or more neural network layers may comprise one or more neural network layers trained to respond to different errors, indicated by respective types 402. For example, one or more machine learning algorithms and/or neural networks, and/or the one or more neural network layers of a given set of code 404, may be trained to receive a given type 402 of an error as input, and cause the error-resolving computing device 112 to implement a particular set of actions as output, as described herein.

Furthermore, there may be as few as one indication of a type 402 of error and one associated set of code 404 (e.g. "N" is equal to "1"), or more than one indication of a type 402 of error and more than one associated set of code 404 (e.g. "N" is equal greater than "1"), including tens to hundreds to thousands of indications of types 402 of errors and associated sets of code 404.

Furthermore, an indication of a type 402 of error, and an associated set of code 404, may be particular to a given provider system 102, such that similar errors that occur in conjunction with the intermediation server 108 communicating with different provider systems 102 may have different indications of types 402 of errors and different sets of associated code 404. Put another way, when a same error occurs in conjunction with the intermediation server 108 communicating with different provider systems 102, the error-resolving computing device 112 may be instructed to respond to the same error with different actions.

Figure 5:
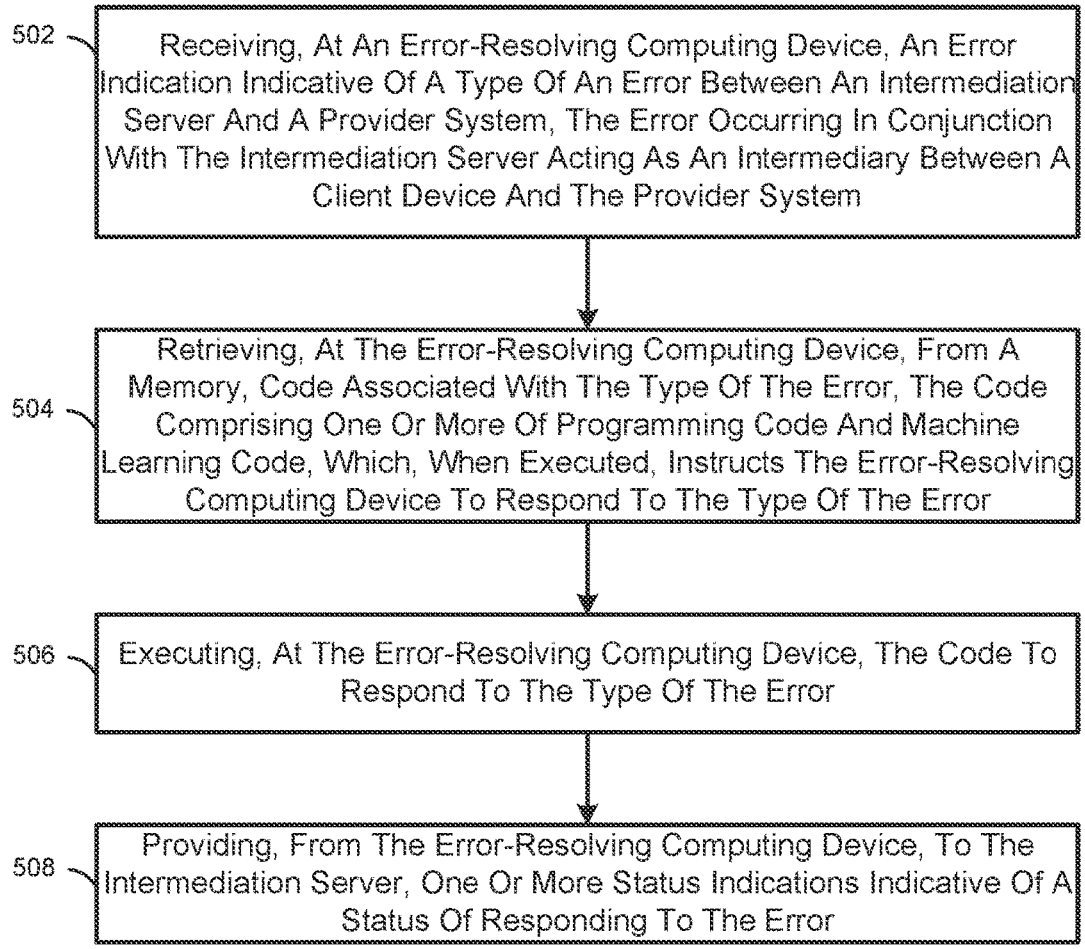
FIG. 5 depicts a flowchart of a method for resolving errors between a client device, an intermediation server and a provider system, according to non-limiting examples.

Attention is now directed to FIG. 5 which depicts a flowchart representative of a method 500 a method for resolving errors between a client device, an intermediation server and a provider system according to indications of possible steps associated with respective provider systems. The operations of the method 500 of FIG. 5 correspond to machine readable instructions that are executed by the error-resolving computing device 112, and specifically the controller 202 of the error-resolving computing device 112. In the illustrated example, the instructions represented by the blocks of FIG. 5 are stored at the memory 204 for example, as the application 206. The method 500 of FIG. 5 is one way in which the controller 202 and/or the error-resolving computing device 112 and/or the system 100 may be configured. Furthermore, the following discussion of the method 500 of FIG. will lead to a further understanding of the system 100, and its various components.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1 and FIG. 4, as well.

It is understood that the method 500 may generally result in the client device 104 and/or the intermediation server 108 reducing usage of processing resources and/or bandwidth in waiting for responses from, respectively, the intermediation server 108 and the provider system 102, when an error has occurred.

At a block 502, the controller 202 and/or the error-resolving computing device 112 receives an error indication indicative of a type 402 of an error between the intermediation server 108 and the provider system 102, the error occurring in conjunction with the intermediation server 108 acting as an intermediary between the client device 104 and the provider system 102.

As has already been mentioned, the error indication received at the block 502 may be received from the intermediation server 108, and may comprise one or more of an error code and a timeout indication.

However, the error indication received at the block 502 may comprise any other suitable error indicators.

In particular examples, the error indication received at the block 502 may comprise an identifier of a step of an offer or an order for a provider object provided by the provider system 102, such as a step 302 of the computing-process flow 110. As such, an identifier of a step received at the block 502 may identify a step 302, associated with the client device 104, that one or more of failed or timed out in conjunction with the intermediation server 108 acting as an intermediary between the client device 104 and the provider system 102. For example, the error indication received at the block 502 may indicate that the requesting step 302-1 timed out, or that the booking step 302-3 timed out, or that the paying step 302-4 timed out. Such time outs may indicate that the intermediation server 108 transmitted data, such as payment data, to the provider system 102, and the provider system 102 failed to respond to the data within a given time period. Continuing with the example of the paying step 302-4 timing out, the provider system 102 may have processed the payment data (e.g. to charge a credit card, and the like, as payment for a provider object), but not responded with an acknowledgement of the payment to the intermediation server 108, which waits for such an acknowledgement, as does the client device 104.

In some examples, the error indication received at the block 502 may comprise data received, at the intermediation server 108, from the provider system 102, in conjunction with an offer or an order associated with an error. Such data may include an error indication received from the provider system 102 and/or an identifier an offer or an order (e.g. such as an Offend, an OrderID, and the like), which may enable the error-resolving computing device 112 to identify, to the provider system 102, the offer or the order associated with the error, among other possibilities. Alternatively, the provider system 102 may have an internal identifier to identify an offer or an order which may be different from an identifier of an offer or an order (e.g. an Offend, an OrderID, and the like) that the intermediation server 108 uses to identify the order; in the travel industry, such an internal identifier of an offer or an order may be referred to as a TravelOfferID or a TravelOrderID.

At a block 504, the controller 202 and/or the error-resolving computing device 112 retrieves, from the memory 400, code 404 associated with the type 402 of the error, the code 404 comprising one or more of programming code and machine learning code, which, when executed, instructs the error-resolving computing device 112 to respond to the type 402 of the error.

For example, as already explained, the error-resolving computing device 112 may receive an error indication indicative of a type 402 of an error between the intermediation server 108 and the provider system 102, search the memory 400 for a matching type 402, and retrieve and execute the associated code 404 to resolve the error.

At a block 506, the controller 202 and/or the error-resolving computing device 112 executes the code 404 (e.g. retrieved at the block 504) to respond to the type 402 of the error.

In some of these examples, the controller 202 and/or the error-resolving computing device 112 executes the code 404 to respond to the type 402 of error by communicating with the provider system 102 to resolve the error.

For example, the controller 202 and/or the error-resolving computing device 112 may execute the code 404 to respond to the type 402 of error by communicating with the provider system 102 to determine a status of an offer or an order for a provider object provided by the provider system 102, the status maintained by the provider system 102, the offer or the order associated with the client device 104, the error associated with the offer or the order. For example, regardless of whether the provider system 102 causes a timeout when failing to respond to a communication from the intermediation server 108, such as a payment request (e.g. that includes payment information such as credit card information, and the like), the provider system 102 may nonetheless process any information received from the intermediation server 108, such as the payment request. Hence, even though the intermediation server 108 may not receive an acknowledgement that a payment request, and the like, was processed, the payment request may have been processed by the provider system 102, and the provider system 102 may store an indication that a payment request for the offer or order has been processed. In these examples, the intermediation server 108 may store a respective indication that the payment request was not yet processed. Hence, it is understood that a status of an offer or an order may be maintained at both the intermediation server 108 and the provider system 102, but it is understood that the status maintained at the provider system 102 is the most accurate and/or most current.

As such, in these examples, the controller 202 and/or the error-resolving computing device 112 may communicate with the provider system 102 to determine a status of an offer or an order associated with an error, and update a local copy of the offer or the order based on the status of the offer or the order maintained by the provider system 102. Continuing with the example of the payment request, when communications with the provider system 102 indicate that an offer or order associated with the error was processed, the controller 202 and/or the error-resolving computing device 112 may communicate the status of the offer or the order, as received from the provider system 102, to the intermediation server 108 to cause the intermediation server 108 to update the status of the offer or the order local to the intermediation server 108. In these examples, it is understood that the term "local copy" refers to a copy of the status maintained by the intermediation server 108, in comparison to the status maintained by the provider system 102 which is considered to be the most accurate and/or current.

Furthermore, it is understood that updating the status of the offer or the order local to the intermediation server 108 may comprise synchronizing the status of the offer or the order maintained by the intermediation server 108 with the respective status of the offer or the order maintained by the provider system 102.

At a block 508, the controller 202 and/or the error-resolving computing device 112 provides, to the intermediation server 108, one or more status indications indicative of a state of responding to the error.

For example, as the controller 202 and/or the error-resolving computing device 112 communicates with the provider system 102 to determine a status of an order and/or offer, and the like, as the controller 202 and/or the error-resolving computing device 112 receives and/or determines changes in such a status and/or receives updates about the status of an order and/or offer, the controller 202 and/or the error-resolving computing device 112 may provide, to the intermediation server 108, such updates as the one or more status indications indicative of a state of responding to the error.

For example, the provider system 102 may initially indicate to the controller 202 and/or the error-resolving computing device 112 that a payment request is being processed and then later indicate to the controller 202 and/or the error-resolving computing device 112 that processing of the payment request has been completed. In these examples, the controller 202 and/or the error-resolving computing device 112 may provide such updates to the intermediation server 108, and the intermediation server 108 may provide such updates, and/or any other suitable status indications indicative of a state of responding to the error as received from the controller 202 and/or the error-resolving computing device 112, to the client device 104.

In some of these examples, the one or more status indications, of the block 508, indicative of the status of responding to the error, may comprise an indication of an estimated time for resolving the error. For example, such an estimated time may be received from the provider system 102, and/or such an estimated time may be determined by the controller 202 and/or the error-resolving computing device 112, for example in conjunction with one or more machine learning algorithms, and the like, for determining such an estimated time. Indeed, such one or more machine learning algorithms may be trained to determine such an estimated time based on historical times that respective errors, or similar errors, took to resolve.

Furthermore, an estimated time for resolving an error may cause the error-resolving computing device 112 and/or the intermediation server 108 to behave differently, depending on whether the estimated time is above or below a threshold time. While examples have already been provided as to how action of the error-resolving computing device 112 may change depending on whether an estimated time is above or below a threshold time (e.g. an order may proceed or be cancelled when the estimated time is respectively above or below threshold time), whether an estimated time is above or below a threshold time may also affect behaviour of the intermediation server 108. For example, when the estimated time is below a threshold time, the intermediation server 108 may not report the error to the client device 104; however, when the estimated time is above a threshold time, the intermediation server 108 may report the error to the client device 104, as a status indication for example along with the estimated time. Put another way, when the estimated time is below a threshold time, the intermediation server 108 may not provide status indications to the client device 104; however, when the estimated time is above a threshold time, the intermediation server 108 may provide status indications to the client device 104, such status indications provided to the intermediation server 108 from the error-resolving computing device 112 at the block 508.

In some examples, the one or more status indications of the block 508 may include an incident identifier associated with the error indication. For example, the intermediation server 108, and/or the controller 202 and/or the error-resolving computing device 112, may assign an incident identifier to the error that caused the error indication to be received, though, in examples where an OfferID, an OrderID, and the like (e.g. any suitable identifier identifying the offer and/or the order associated with the error of the block 502), has been generated, the OfferID or the OrderID, and the like, may be used as the incident identifier (or, alternatively, a TravelOfferID or a TravelOrderID).

In some of these examples, the method 500 may further comprise, the controller 202 and/or the error-resolving computing device 112: receiving from the client-interface computing device 114 in communication with the client device 104, a request for a status of an offer or an order for a provider object provided by the provider system 102, the offer or the order maintained by the provider system 102, the offer or the order associated with the client device 104, the error associated with the offer or the order, and the error identified by the incident identifier; and returning, to the client-interface computing device 114, one or more of the status of the offer or the order, and progress of the error-resolving computing device 112 in responding to the error.

In particular, the intermediation server 108 may provide, to the client device 104, the incident identifier, and the incident identifier may be used, by the client device 104, to request, from the controller 202 and/or the error-resolving computing device 112, via the client-interface computing device 114, one or more of the status of the offer or the order, and progress of the error-resolving computing device 112 in responding to the error. Hence, in these examples, the client-interface computing device 114 may act as a portal to the error-resolving computing device 112.

Alternatively, the controller 202 and/or the error-resolving computing device 112 may proactively provide, to the client device 104, via the client-interface computing device 114, one or more of the status of the offer or the order, and progress of the error-resolving computing device 112 in responding to the error.

However, the client-interface computing device 114 acting as a portal to the error-resolving computing device 112 may be used to implement other functionality in the system 100.

For example, the method 500 may further comprise, the controller 202 and/or the error-resolving computing device 112: receiving, from the client-interface computing device 114 in communication with the client device 104, a request to cancel or roll back a step of an offer or an order for a provider object provided by the provider system 102, the offer or the order maintained by the provider system 102, the offer or the order associated with the client device, the error associated with the offer or the order, and the error identified by the incident identifier; and communicating with the provider system 102 to cancel the offer or the order, or roll back to an earlier step of the offer or the order, according to the request.

For example, when an error, such as a timeout occurs at the provider system 102 in conjunction with an implementation of a step 302 of the computing-process flow 110, such as a timeout on the booking step 302-3 or the payment step 302-4, the controller 202 and/or the error-resolving computing device 112 may provide one or more status indications to the intermediation server 108 which may provide the one or more status indications to the client device 104. However, as mentioned above, whether or not status indications are provided to the client device 104 may depend on whether or not an estimated time to resolve an error is above or below a threshold time.

The client device 104 may automatically, or via input received at the client device 104, determine that the order (or offer) associated with the error is to be rolled back to be cancelled, or rolled back to an earlier step 302 in the computing-process flow 110. For example, when a timeout occurs in association with the payment step 302-4, the client device 104 may make a determination to roll back the computing-process flow 110 to the booking step 302-3, and/or to cancel the payment request provided at the payment step 302-4. As such, the controller 202 and/or the error-resolving computing device 112 may provide the request to cancel, or roll back a step of, the offer or the order to the provider system 102, and communicate with the provider system 102 accordingly. The provider system 102 may respond by performing the requested action, cancelling any payment request that may have already been processed, and provide, to the client device 104, via the intermediation server 108, or a combination of the error-resolving computing device 112 and the client-interface computing device 114, an indication that the offer or the order has been cancelled, and/or an updated status of the offer or the order. The intermediation server 108, and/or the error-resolving computing device 112 may update the local copy of the status of the offer or the order as described above.

In particular, when a roll back occurs to an earlier step 302 of the computing-process flow 110, the client device 104 may render the associated GUI at a local display screen, and the like of the earlier step 302. For example, the computing-process flow 110 is rolled back from the payment step 302-4 to the booking step 302-3, the client device 104 may again provide, at a display screen, information for a selected provider object (e.g. selected at the booking step 302-2), and from which a user of the client device 104 may select electronic buttons to pay for the selected provider object, and/or to add a service to a booking, such as a pickup service, and the like. As such, it is understood that the client device 104 and/or the intermediation server 108 may maintain suitable information that enables the client device 104 to again implement the booking step 302-3 (or any earlier step 302), for example by way of the client device 104 retrieving such information from a suitable memory, and/or by way of the intermediation server 108 retrieving such information from a suitable memory and providing to the client device 104.

Returning to the block 506, examples provided herein of actions that may be implemented by the error-resolving computing device 112 in conjunction with execution of code 404, are understood to be non-exhaustive, and for a given type 402 of error, any suitable actions may occur, by way of processing respective code 404. For example, other actions that may occur to respond to a type 402 of error may include, but are not limited to:

Reinitiating a payment for an offer or an order. For example, such reinitiating may occur when the payment request was not processed at the provider system 102

Messaging to communication devices of any suitable users and/or administrators of the system 100. For example, such messaging may include, but is not limited to, sending an email, a text message, and the like, to such communication devices of such users and/or administrators; it is understood in such examples that network addresses and/or email addresses and/or phone numbers, and the like, of such users and/or administrators have been provisioned at the error-resolving computing device 112, such as at the memory 400.

Any other suitable actions.

Furthermore, a set of code 404 may include an indication of how many times the error-resolving computing device 112 may try to resolve an error. In these examples, for a particular error, a first attempt to communicate with the provider system 102 may fail and/or fail to resolve the error, and the set of respective code 404 may indicate that the error-resolving computing device 112 is to attempt to communicate with the provider system 102 to resolve the error a maximum of three times, and/or any other suitable number (e.g. one time, two times, four times, among other possibilities). The set of respective code 404 may also indicate actions to take should a failure to communicate with the provider system 102 and/or failure to resolve the error occur, such as initiating messaging and/or communication with a communication device of a representative and/or administrator of a provider system 102.

The system 100 and/or the error-resolving computing device 112 and/or the method 500 may be adapted to include any other suitable features.

For example, the error-resolving computing device 112 may maintain an incident database (e.g. at the memory 400 and/or any other suitable memory) that includes, for errors that occur in the system 100, respective incident identifiers, respective error types 402, respective times of errors, respective times to resolve errors, respective order identifiers and/or respective offer identifiers, respective status indicators, respective records of any suitable actions that occurred in conjunction with an error (e.g. such as cancelling an offer or an order, rolling back a step) and the like. Indeed, such information may be used to further train one or more machine learning algorithms on how to respond to future errors and/or to update respective code 404. Furthermore, such information may be used to further train one or more machine learning algorithms on how long a given provider system 102 may take to respond to a communication from the error-resolving computing device 112 and/or to estimate a time to resolve an error. Furthermore, such information may include an incident ticket number, and the like, that is used to log an error such that follow-up actions may be performed and/or to assist certain activities, such as activities that occur in association with a help desk that is reviewing the error, and the like.

Figure 6:
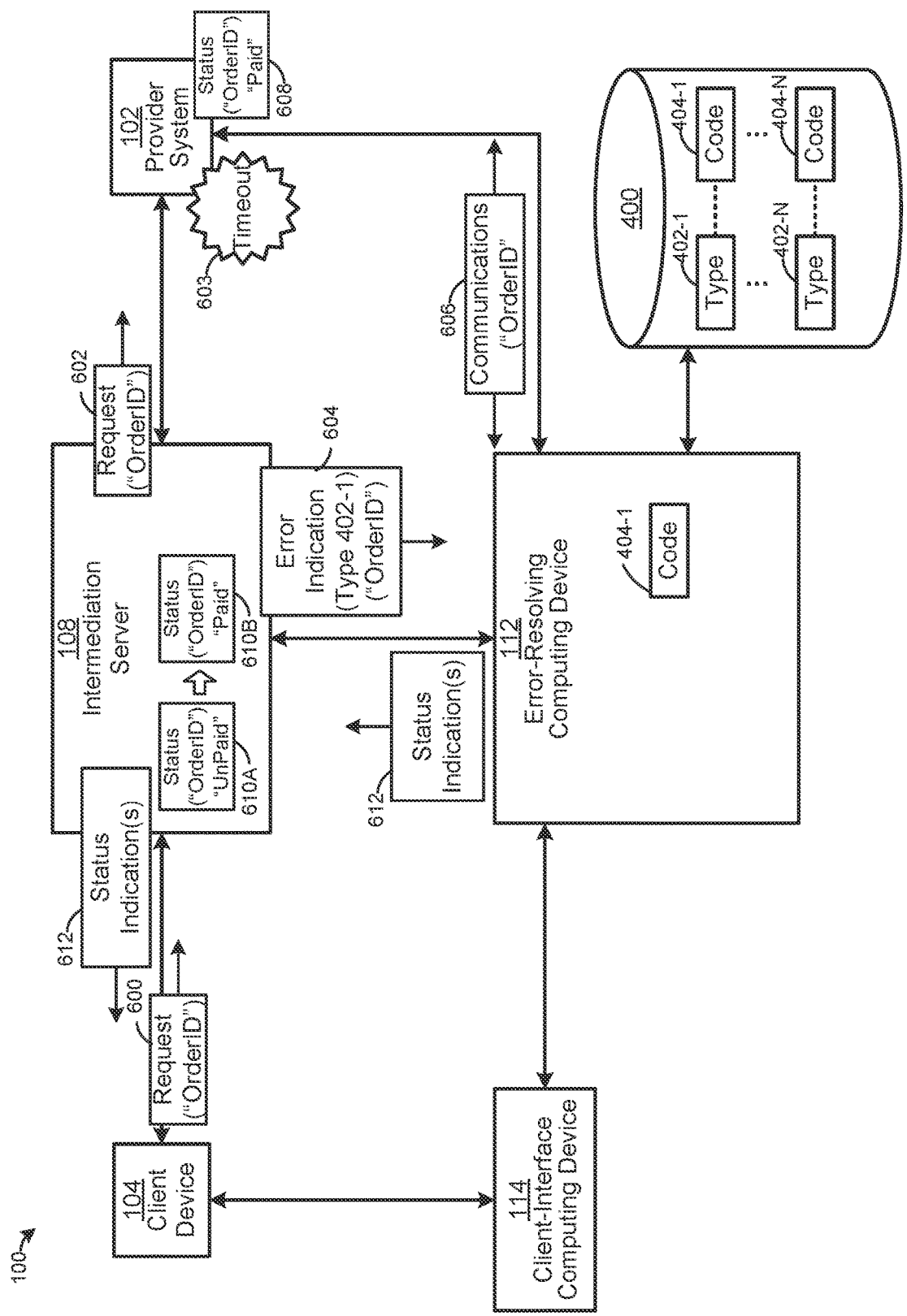
FIG. 6 depicts the system of FIG. 4 implementing a method for resolving errors between a client device, an intermediation server and a provider system, according to non-limiting examples.

Attention is next directed to FIG. 6 which depicts aspects of an example of the method 500. FIG. 6 is substantially similar to FIG. 4 with like components having like numbers.

At FIG. 6, a request 600 to process payment information (e.g. not depicted, but included in the request 600) is received at the intermediation server 108 from the client device 104 (e.g. in conjunction with implementation of the computing-process flow 110). The intermediation server 108 forwards and/or provides a similar request 602 to the provider system 102. However, a timeout 603 occurs at the provider system 102, for example in response to the request 602 to process payment information (e.g. not depicted, but included in the request 602) received at the provider system 102 from the intermediation server 108. As depicted, the request 602 includes an "OrderID" identifying an order associated with a provider object that is to be paid by using the payment information of the request 602.

While not depicted, the provider system 102 may provide an error indication for the timeout 603 to the intermediation server 108.

Regardless, the intermediation server 108 determines that the timeout 603 occurred (e.g. either by way of not receiving a response to the request 602 within a given time period, and/or by the provider system 102 providing an error indication for the timeout 603 to the intermediation server 108). In response to determining that the timeout 603 occurred, the intermediation server 108 generates an error indication 604 of the timeout 603, and provides the error indication 604 to the error-resolving computing device 112. As depicted, the error indication 604 includes an indication of a type 402-1 of the error that occurred; for example, as depicted, it is understood that the type 402-1 of the error identifies a timeout such that occurred in conjunction with a payment request (e.g. the request 602) occurring during the payment step 302-4 of the computing-process flow 110, for example the timeout 603. Hence, it is understood that the intermediation server 108 has access to the indications of the types 402 (e.g. at a memory associated with the intermediation server 108), such that the intermediation server 108 may populate the error indication 604 accordingly.

As depicted, the error indication 604 also includes the "OrderID" of the request 602. While not depicted, the error indication 604 may include traces and/or information of transaction data (e.g. such as credit card data and/or any other suitable data extracted from one or more of the requests 600, 602 and, if available any data that may have been provided by the provider system 102 in conjunction with the occurrence of the timeout 603).

The error-resolving computing device 112 receives (e.g. at the block 502 of the method 500) the error indication 604 and retrieves (e.g. at the block 504 of the method 500), from the memory 400, the code 404-1 associated with the type 402-1 of the error indicated by the error indication 604. The error-resolving computing device 112 may further generate an incident indication in a database (e.g. such as in the memory 400), and generate an associated incident number and/or incident ticket number, and the like.

The error-resolving computing device 112 executes (e.g. at the block 506 of the method 500) the code 404-1 (e.g. by way of the controller 202 processing the code 404-1) and communicates with the provider system 102 to resolve the error of the timeout 603. For example, as depicted, communications 606 between the error-resolving computing device 112 and the provider system 102 occur, the communications 606 including the "OrderID" of the request 602, to resolve the error of the timeout 603. It is understood, however, that alternatively and/or in addition, the communications 606 may occur via the intermediation server 108. Such resolutions may include determining a status 608 at the provider system 102 of the order identified by the "OrderID" of the request 602 (e.g. as indicated the status 608 is "Paid"), updating a local copy of the status of the order identified by the "OrderID" of the request 602 at the intermediation server 108 (e.g. a copy 610A of the status 608 that indicates the order is "UnPaid" is changed to a copy 610B that indicates the order is "Paid"), requesting to process the payment information of the request 602 (e.g. if not already paid), and the like.

As progress in resolving the error of the timeout 603 occurs, the error-resolving computing device 112 provides (e.g. at the block 508 of the method 500) one or more status indications 612 to the intermediation server 108, which may optionally provide one or more of the status indications 612 to the client device 104 (e.g. depending on an estimated time to resolve the error of the timeout 603). Such status indications 612 may include, but are not limited to, any suitable reference data that indicates an incident logged by the error-resolving computing device 112 in a database, including, but not limited to an incident ticket number, for use in any follow-up actions.

Figure 7:
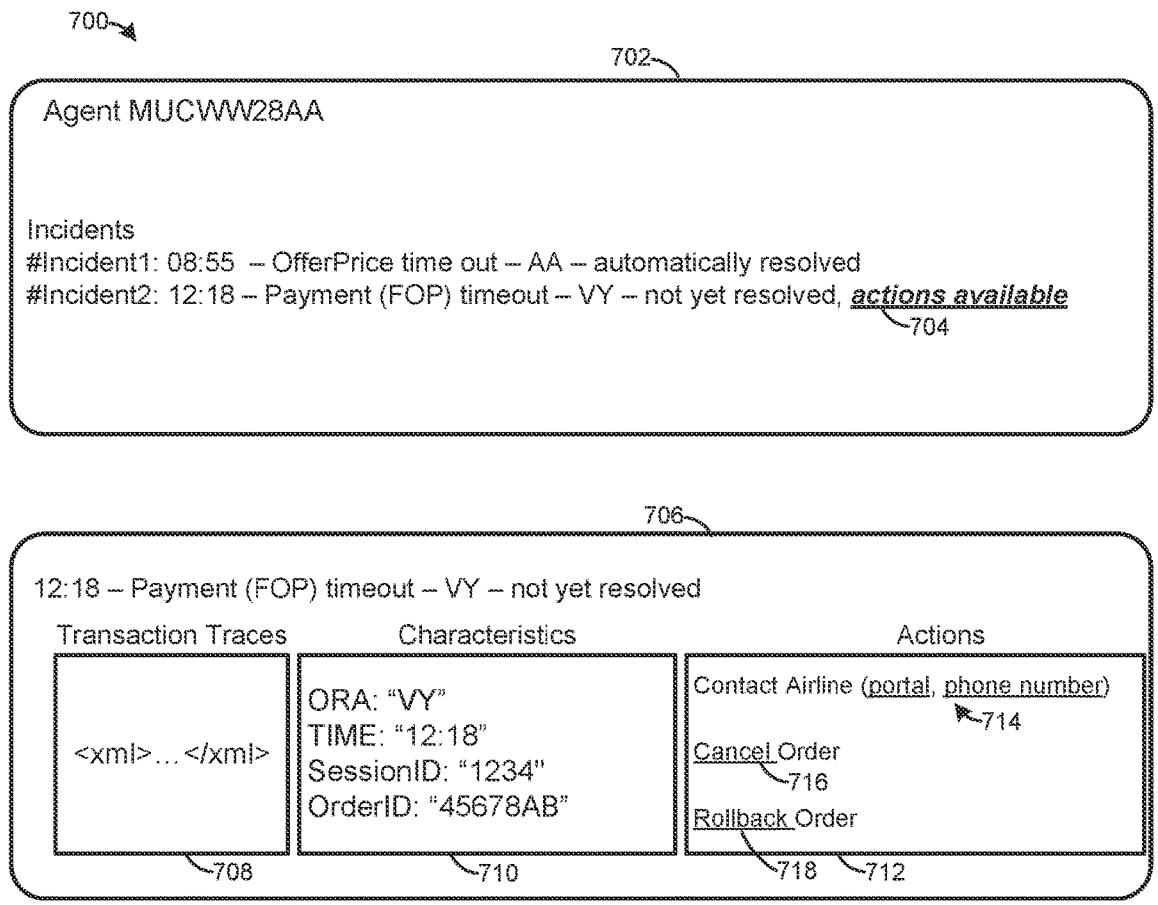
FIG. 7 depicts a graphic user interface of a portal of a client-interface device of the system of FIG. 1, according to non-limiting examples.

Attention is next directed to FIG. 7 which depicts a GUI 700 that may be accessed by the client device 104 at the client-interface computing device 114. The GUI 700 may be rendered at a display screen of the client device 104, and may be accessed via a browser being implemented by the client device 104, and/or any suitable dedicated-purpose application being implemented by the client device 104 that is dedicated to communications with the client-interface computing device 114. Regardless, the GUI 700 may graphically represent the portal functionality of the client-interface computing device 114.

The GUI 700 comprises a list 702 of incidents of errors that occurred when a particular user (e.g. "Agent MUCWW28AA") was operating the client device 104. As such, it is understood that a particular user may log-in to the client device 104 and/or the intermediation server 108, and that errors that occur in the system 100 may be associated with credentials of the particular user. Furthermore, when the particular user logs in to the client device 104, and starts a "session" (which may occur between the particular user logging in to the client device 104 and logging out of the client device 104), the session may be assigned an identifier which may be referred to as session identifier.

Hence, when the particular user uses their credentials to access the client-interface computing device 114 via the GUI 700, the list 702 provides list of incidents of errors that occurred in association with the credentials of the particular user. The list 702 is understood to be populated from an incident database maintained by the error-resolving computing device 112.

As depicted, the list 702 includes two incidents (e.g. errors) that occurred at indicated times. For example, an incident #1 (e.g. "incident #1" may comprise an incident ticket number) indicates that a timeout occurred during a booking step 302-3 in which a fixed price for a provider object (e.g. an "OfferPrice" action in which a fixed price is requested) was requested from a provider system 102 (e.g. an airline) identified by an identifier "AA". However, the list 702 indicates that the incident #1 was automatically resolved, for example by the error-resolving computing device 112.

In contrast, an incident #2 (e.g. "incident #2" may comprise an incident ticket number) indicates that a timeout occurred during a payment step 302-4 for an order, in which a form of payment (FOP), such as a credit card number, was provided to a provider system 102 (e.g. an airline) identified by an identifier "VY". However, the list 702 indicates that the incident #2 was not resolved, and indicates that actions are available to the client device 104, for example to cancel or roll back the order. For example, upon selection of a link 704 associated with the incident #2, the GUI 700 may provide details 706 of the incident #2.

As depicted, the details 706 include similar information for the incident #2 as provided in the list 702, and various other information including, but not limited to:

Transaction traces 708 associated with the incident #2, which, as depicted, may include, but is not limited to, an XML (Extensible Markup Language) file showing communications between the intermediation server 108 and the provider system 102 and/or communications between the error-resolving computing device 112 and the provider system 102, and/or any other information that provides a context for the incident #2.

Characteristics 710 associated with the incident #2, which, as depicted, may include, but is not limited to, a name of an Offer Responsible Airline (ORA) (e.g. "VY"), a time ("TIME") of the incident (e.g. "12:18"), a session identifier (SessionID or "1234"), and an OrderID (e.g. "45678AB") associated with the provider object associated with the incident. However, any other suitable information may be provided in the characteristics 710; for example, an Offer ID, a TravelOfferID and/or a TravelOrderID may be included in the characteristics 710, and/or an identifier (e.g. a Point of Sale (POS) identifier) of the client device 104 may be included in the characteristics 710.

Actions 712 associated with the incident #2, which, as depicted, may include, but is not limited to, links 714 to contact the provider system 102 associated with the incident #2 (e.g. a browser link to an airline portal, and/or a link to retrieve a phone number of the provider system 102 (e.g. airline) and/or initiate a call with the provider system 102 (e.g. airline)), a link 716 to cancel the order associated with the incident #2, and a link 718 to roll back the order associated with the incident #2, as described above. Alternatively, the actions 712 may not include links, but rather may include one or more of contact information (e.g. a phone number for the provider system 102 and/or airline), and/or textual instructions that the particular user may follow. However, any suitable actions are understood to be provided at the details 706.

As should by now be apparent, the operations and functions of the devices described herein are sufficiently complex as to require their implementation on a computer system, and cannot be performed, as a practical matter, in the human mind. In particular, computing devices, and the like, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
receiving, at an error-resolving computing device, an error indication indicative of a type of an error between an intermediation server and a provider system, the error occurring in conjunction with the intermediation server acting as an intermediary between a client device and the provider system;
retrieving, at the error-resolving computing device, from a memory, code associated with the type of the error, the code comprising one or more of programming code and machine learning code, which, when executed, instructs the error-resolving computing device to respond to the type of the error by attempting to resolve the error;
executing, at the error-resolving computing device, the code to respond to the type of the error by communicating with the provider system to attempt to resolve the error;
providing, from the error-resolving computing device, to the intermediation server, one or more status indications indicative of a state of responding to the error;
executing, at the error-resolving computing device, the code to respond to the type of the error by communicating with the provider system to determine a status of an offer or an order for a provider object provided by the provider system, the status maintained by the provider system, the offer or the order associated with the client device, the error associated with the offer or the order; and
updating a local copy of the offer or the order based on the status of the offer or the order maintained by the provider system.

2. The method of claim 1, wherein the error indication comprises one or more of an error code and a timeout indication.

3. The method of claim 1, wherein the error indication comprises one or more of:
an identifier of a step of an offer or an order for a provider object provided by the provider system, the step associated with the client device, that one or more of failed or timed out in conjunction with the intermediation server acting as the intermediary between the client device and the provider system; and
data received, at the intermediation server, from the provider system, in conjunction with the order.

4. The method of claim 1, wherein the one or more status indications include an incident identifier associated with the error indication, the method further comprising:
receiving, at the error-resolving computing device, from a client-interface computing device in communication with the client device, a request for the status of the offer or the order for the provider object provided by the provider system, the offer or the order maintained by the provider system, the offer or the order associated with the client device, the error associated with the offer or the order, and the error identified by the incident identifier; and
returning, from the error-resolving computing device, to the client-interface computing device, one or more of the status of the offer or the order, and progress of the error-resolving computing device in responding to the error.

5. The method of claim 1, wherein the one or more status indications include an incident identifier associated with the error indication, the method further comprising:
receiving, at the error-resolving computing device, from a client-interface computing device in communication with the client device, a request to cancel or roll back a step of an offer or an order for a provider object provided by the provider system, the offer or the order maintained by the provider system, the offer or the order associated with the client device, the error associated with the offer or the order, and the error identified by the incident identifier; and
communicating, at the error-resolving computing device, with the provider system to cancel the order or roll back to an earlier step of the offer or the order, according to the request.

6. The method of claim 1, wherein the one or more status indications indicative of the state of responding to the error comprise an indication of an estimated time for resolving the error.

7. A device comprising:
a communication interface; and
a controller configured to:
receive, via the communication interface, an error indication indicative of a type of an error between an intermediation server and a provider system, the error occurring in conjunction with the intermediation server acting as an intermediary between a client device and the provider system;
retrieve, from a memory, code associated with the type of the error, the code comprising one or more of programming code and machine learning code, which, when executed, instructs the error-resolving computing device to respond to the type of the error by attempting to resolve the error;
execute the code to respond to the type of the error by communicating with the provider system to attempt to resolve the error;
provide, via the communication interface, to the intermediation server, one or more status indications indicative of a state of responding to the error;
execute the code to respond to the type of the error by communicating with the provider system to determine a status of an offer or an order for a provider object provided by the provider system, the status maintained by the provider system, the offer or the order associated with the client device, the error associated with the order; and
update a local copy of the offer or the order based on the status of the offer or the order maintained by the provider system.

8. The device of claim 7, wherein the error indication comprises one or more of an error code and a timeout indication.

9. The device of claim 7, wherein the error indication comprises one or more of:
an identifier of a step of an offer or an order for a provider object provided by the provider system, the step associated with the client device, that one or more of failed or timed out in conjunction with the intermediation server acting as the intermediary between the client device and the provider system; and
data received, at the intermediation server, from the provider system, in conjunction with the order.

10. The device of claim 7, wherein the one or more status indications include an incident identifier associated with the error indication, and the controller is further configured to:
receive, from a client-interface computing device in communication with the client device, a request for the status of the offer or the order for the provider object provided by the provider system, the offer or the order maintained by the provider system, the offer or the order associated with the client device, the error associated with the offer or the order, and the error identified by the incident identifier; and return, to the client-interface computing device, one or more of the status of the offer or the order, and progress of the error-resolving computing device in responding to the error.

11. The device of claim 7, wherein the one or more status indications include an incident identifier associated with the error indication, and the controller is further configured to:

receive, from a client-interface computing device in communication with the client device, a request to cancel or roll back a step of an offer or an order for a provider object provided by the provider system, the offer or the order maintained by the provider system, the offer or the order associated with the client device, the error associated with the offer or the order, and the error identified by the incident identifier; and communicate with the provider system to cancel the order or roll back to an earlier step of the offer or the order, according to the request.

12. The device of claim 7, wherein the one or more status indications indicative of the state of responding to the error comprise an indication of an estimated time for resolving the error.

13. A method comprising:

receiving, at an error-resolving computing device, an error indication indicative of a type of an error between an intermediation server and a provider system, the error occurring in conjunction with the intermediation server acting as an intermediary between a client device and the provider system;

retrieving, at the error-resolving computing device, from a memory, code associated with the type of the error, the code comprising one or more of programming code and machine learning code, which, when executed, instructs the error-resolving computing device to respond to the type of the error by attempting to resolve the error;

executing, at the error-resolving computing device, the code to respond to the type of the error by communicating with the provider system to attempt to resolve the error; providing, from the error-resolving computing device, to the intermediation server, one or more status indications indicative of a state of responding to the error, wherein the one or more status indications include an incident identifier associated with the error indication;

receiving, at the error-resolving computing device, from a client-interface computing device in communication with the client device, a request for status of an offer or an order for a provider object provided by the provider system, the offer or the order maintained by the provider system, the offer or the order associated with the client device, the error associated with the offer or the order, and the error identified by the incident identifier; and returning, from the error-resolving computing device, to the client-interface computing device, one or more of the status of the offer or the order, and progress of the error-resolving computing device in responding to the error.

14. The method of claim 13, wherein the error indication comprises one or more of:

an error code;

a timeout indication;

an identifier of a step of an offer or an order for a provider object provided by the provider system, the step associated with the client device, that one or more of failed or timed out in conjunction with the intermediation server acting as the intermediary between the client device and the provider system; and data received, at the intermediation server, from the provider system, in conjunction with the order.

15. The method of claim 13, wherein the one or more status indications include an incident identifier associated with the error indication, the method further comprising:

receiving, at the error-resolving computing device, from the client-interface computing device in communication with the client device, a respective request to cancel or roll back a step of the offer or the order for the provider object provided by the provider system, the offer or the order maintained by the provider system, the offer or the order associated with the client device, the error associated with the offer or the order, and the error identified by the incident identifier; and communicating, at the error-resolving computing device, with the provider system to cancel the order or roll back to an earlier step of the offer or the order, according to the request.

16. The method of claim 13, wherein the one or more status indications indicative of the state of responding to the error comprise an indication of an estimated time for resolving the error.

* * * * *